Sept. 14, 1943.  R. K. ROURKE  2,329,299

PNEUMATIC CLASSIFIER

Filed Oct. 29, 1941  4 Sheets-Sheet 1

INVENTOR
RUPERT K. ROURKE
BY Virgil C Kline
ATTORNEY

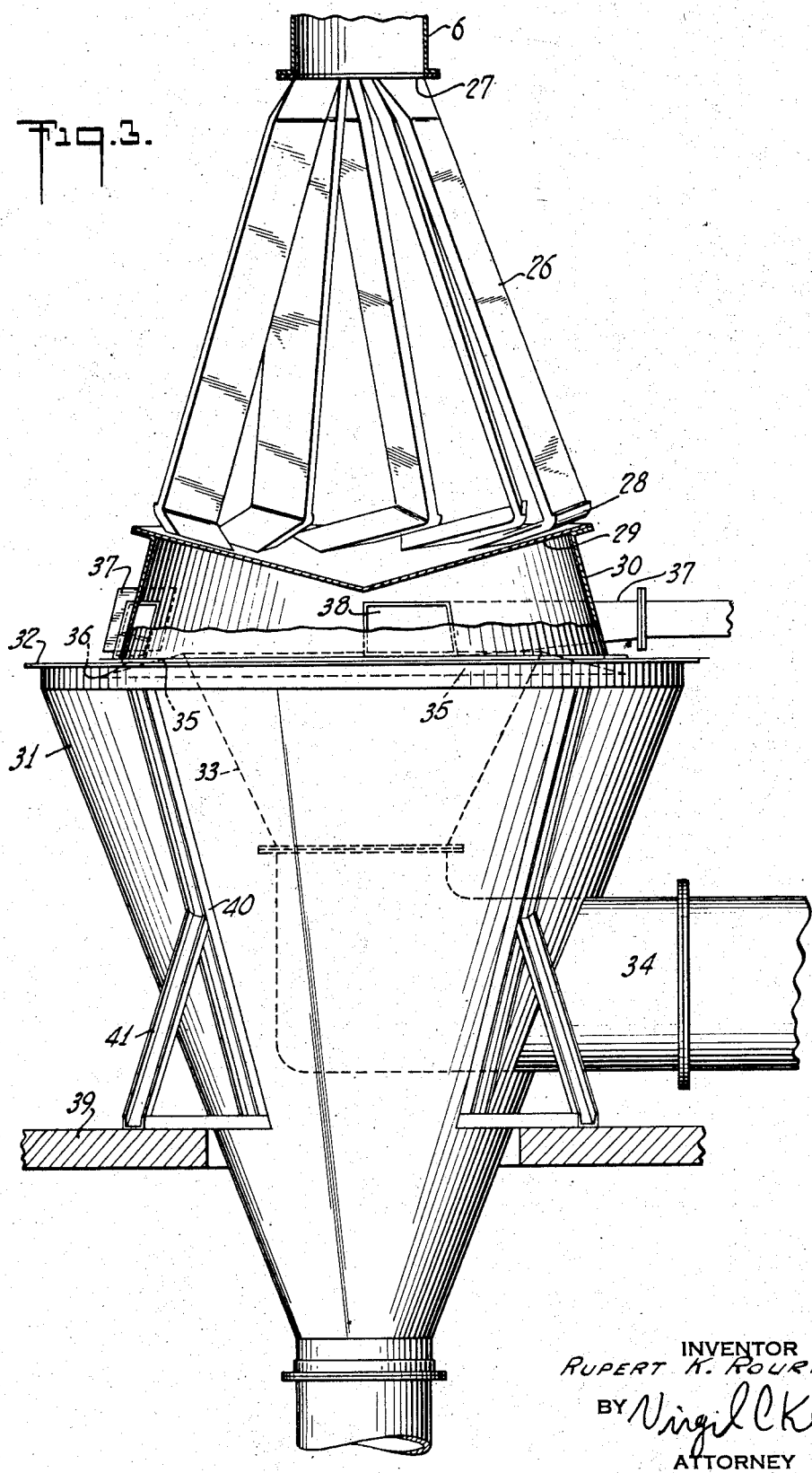

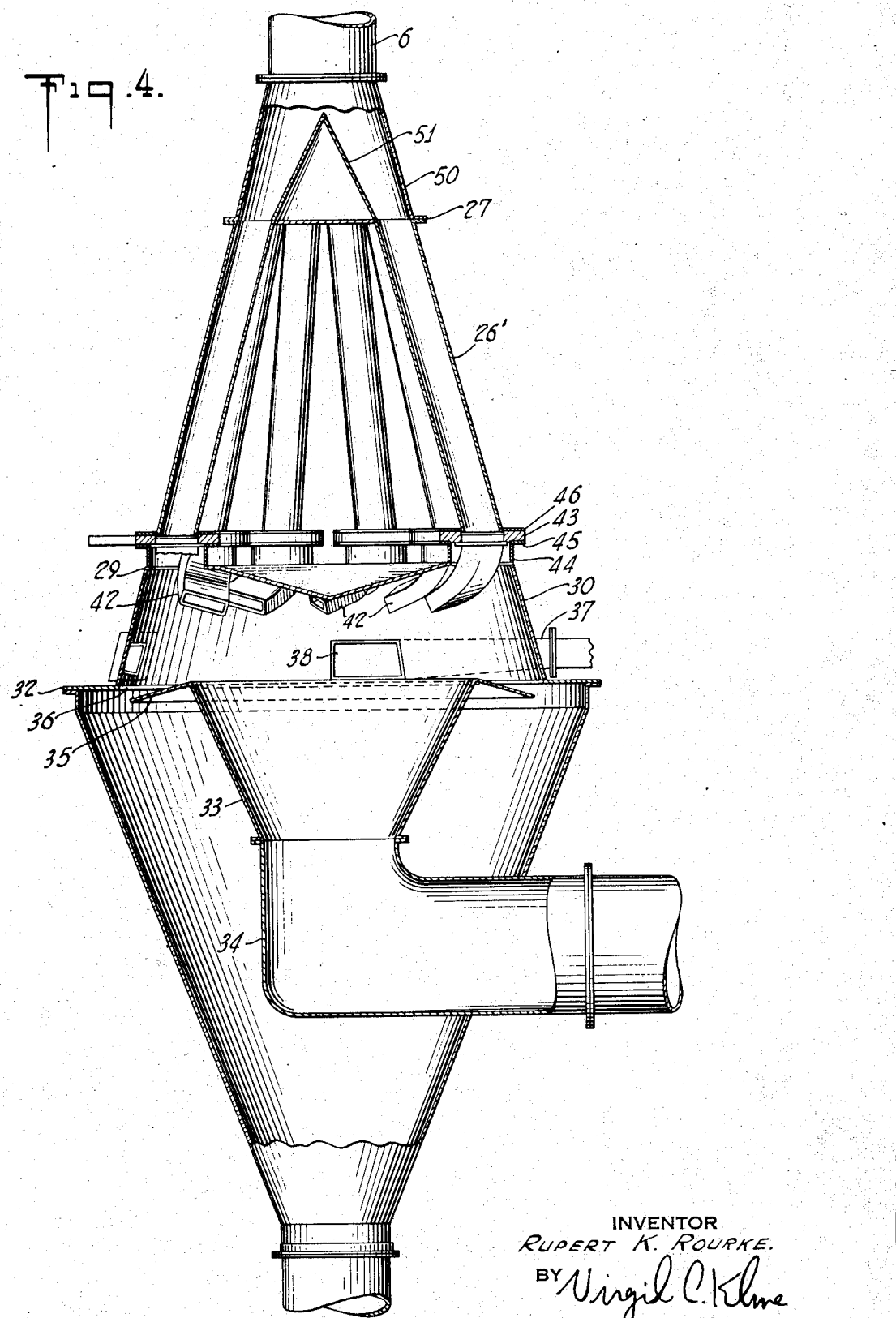

Sept. 14, 1943.　　　R. K. ROURKE　　　2,329,299
PNEUMATIC CLASSIFIER
Filed Oct. 29, 1941　　　4 Sheets-Sheet 4
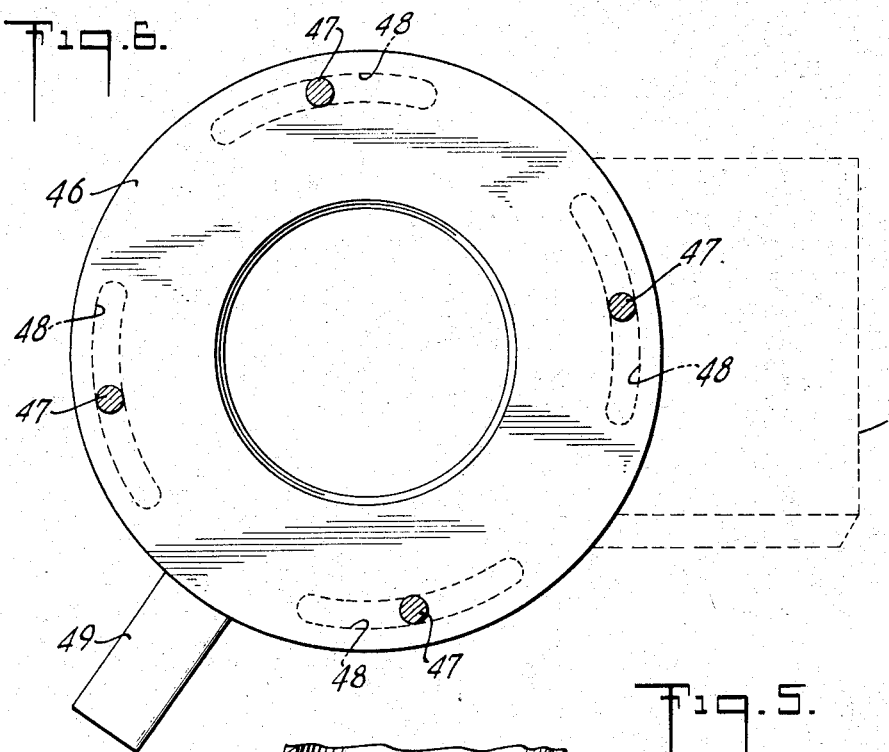
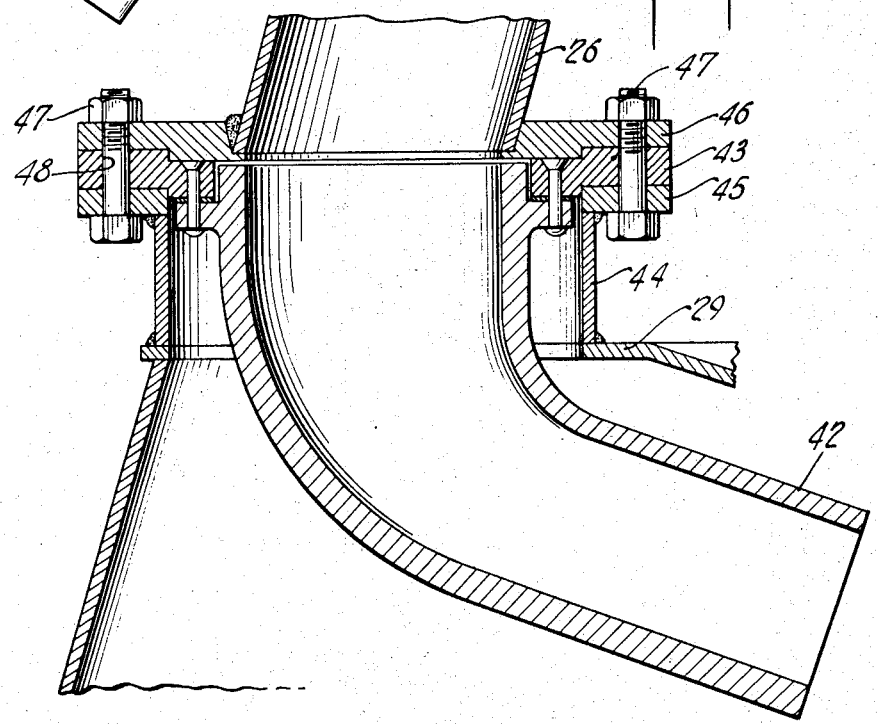
INVENTOR
RUPERT K. ROURKE.
BY Virgil C. Kline
ATTORNEY Patented Sept. 14, 1943

2,329,299

UNITED STATES PATENT OFFICE 2,329,299

PNEUMATIC CLASSIFIER

Rupert K. Rourke, Lompoc, Calif., assignor to Johns-Manville Corporation, New York, N. Y., a corporation of New York Application October 29, 1941, Serial No. 416,935

2 Claims. (Cl. 209—144)

This invention relates to an apparatus suitably adapted for treating disintegrated, pulverulent or comminuted materials, such as non-metallic minerals, clays, etc. The apparatus is especially adapted for the classification of the coarse particle size diatomaceous earth powders into components which differ primarily in particle size and/or particles which are larger than or heavier than remaining portions of such disintegrated materials. It is also particularly adapted for treating diatomaceous earth for more complete separation of the disintegrated fine materials from the larger and heavier components than any other separating apparatus heretofore known.

One of the most important applications of the present novel apparatus is in the classification of coarse particle size diatomaceous earth materials in order to separate the materials into two components which differ primarily only in particle size. As for example, the separating apparatus described herein will separate products into components which have a greatly increased flow rate, if the products are used as filter aids, as compared to the flow rate of products obtained as a result of the separating action in previously known separators. Fast flow rate filter aids are very desirable products in industries using filter aids, and the separated components obtained in the present classifier have unusually high flow rates as will be illustrated below. These high flow rate components are obtained by passing diatomaceous earth through the present classifier, a result which has not heretofore been obtainable through previously known classifiers. In filtration practice, a 30 to 40 per cent increase in flow rate of the fast flow rate product is of substantial importance in the industry.

Another application of the classifier is to remove impurities from such materials as diatomaceous earth (either calcined, uncalcined or chemically treated), bleaching clays, or decolorizing materials. It is needless to state in detail the reasons for such removal, but for the purpose of illustration it is noted that in the manufacture of diatomaceous filter aids the removal of coarse particles is desirable, inasmuch as such coarse particles do not function as effective components in filter aids. Very often the impurities are within the particle size range of the desirable components, but have a higher specific gravity than the desirable components. It is desirable to remove such impurities from the materials.

In prior methods of classifying disintegrated and comminuted materials, separators of the cyclone type have been used extensively. Difficulty has, however, been experienced in such separators because of the tendency of the finer particles to adhere to larger particles and thus be carried by the larger particles out of the system. It is highly desirable that the finer particles be removed from the coarse particles, thus obtaining more sharply defined separations of the various components. Another type of apparatus suitable for classifying pulverulent and comminuted materials is the pneumatic classifier as disclosed in my previous Patent No. 2,125,086, granted July 26, 1938. The invention disclosed in the present application is an improvement on the apparatus disclosed and claimed in my earlier patent.

It will be noted that in the separator disclosed in Patent No. 2,125,086, fluid bearing suspended particles is introduced substantially tangentially at the side walls of the classifying chamber. The fluid is, therefore, directed into the classifying chamber towards or along the side walls of said chamber. As a result there is a tendency for the whole mass of suspended particles to be thrown directly against the walls of the classifying chamber. This is particularly true of diatomaceous earth particles which have a tendency to cling together or agglomerate.

In the separator disclosed in the present invention, fluid is introduced through the top of the separating chamber at an angle to the horizontal. The fluid streams are directed so as to form a downwardly moving vortex. The distance which the bulk of the suspended particles would have to travel before they could come in contact with the walls of the classifier is relatively large compared to that in the previous separator. This gives the larger and heavier particles (which have greater outward velocity components due to centrifugal force than the smaller and lighter particles) a greater opportunity to separate from the smaller and lighter ones.

Broadly stated, the method of this invention distinguishes over prior known methods in that the fluid bearing disintegrated, pulverulent and comminuted materials in suspension is continuously introduced into a classifying or separating zone at an angle to the horizontal plane, and directed so that a downwardly moving vortex is created. Simultaneously, additional fluid is injected into the classifying zone in a substantially horizontal plane.

The fluid bearing disintegrated materials and also the additional washing or secondary fluid are introduced into the classification zone at sufficient velocities to form a rapidly rotating vortex.

The centrifugal force on the particles resulting from their being suspended in the fluid vortex imparts different outward velocity components to particles of different sizes and different weights. The larger and heavier particles have greater outward velocity components than the smaller and lighter ones. Opposed to this outward velocity component is the inward velocity component caused by the inward movement of the fluid medium toward the classifier outlet. The largest and heaviest particles will have the greatest resultant outward velocity and will be thrown out of the fluid vortex before said fluid containing the remaining finer particles passes into the classifier outlet. The additional fluid introduced in the substantially horizontal plane exerts a washing action of the particles tending to carry fine particles thrown out with the coarse back into the fluid stream. The result is that the mixture of various sized particles, introduced into the separator, is divided into a coarse and a fine fraction, the coarse fraction containing the highest percentage of the larger particles, and the fine fraction containing the highest percentage of the smaller particles.

Due to the combined action of the two fluids injected at different points and at different angles into the classifying chamber, the tendency for fine particles to adhere to the larger particles is minimized. This results in a high efficiency of separation of coarse from fine particles.

It is preferable that the fluid means introduced in the substantially horizontal plane be substantially free from any disintegrated material. The secondary fluid is introduced at a plurality of circumferentially spaced points so that the larger particles of the downwardly moving vortex will be subjected to the blasts of the incoming secondary fluid. After the coarse particles have been forced to the outside of the vortex, they are discharged into a collecting hopper through an annular outlet formed by the lower edge of the walls of the classifying chamber and a separating cone placed below it. The fluid bearing the fine fraction of suspended particles leaves the separating chamber through an outlet conduit placed centrally in the separating cone.

In the method and apparatus of the present invention, the suspended fine and coarse materials move downwardly along different paths, and the separation of the fine and coarse materials takes place without substantially relying upon the force of gravity.

In describing the invention, reference will be made to the appended drawings, which disclose a preferred apparatus especially suitable for the improved method of separating fluid-suspended disintegrated and comminuted materials. In the drawings:

Fig. 1 diagrammatically represents a combined separating, classifying and auxiliary equipment ordinarily used in the operation;

Fig. 3 is a side elevation, partly in section, of the preferred form of the classifier;

Fig. 4 is a section view of a modified form of the improved classifier;

Fig. 5 is a section view of an adjustable elbow section through which the fluid materials are forced; and Fig. 6 is a plan view, partly in phantom, illustrating the adjusting means for the elbow in Fig. 5.

Figure 1:
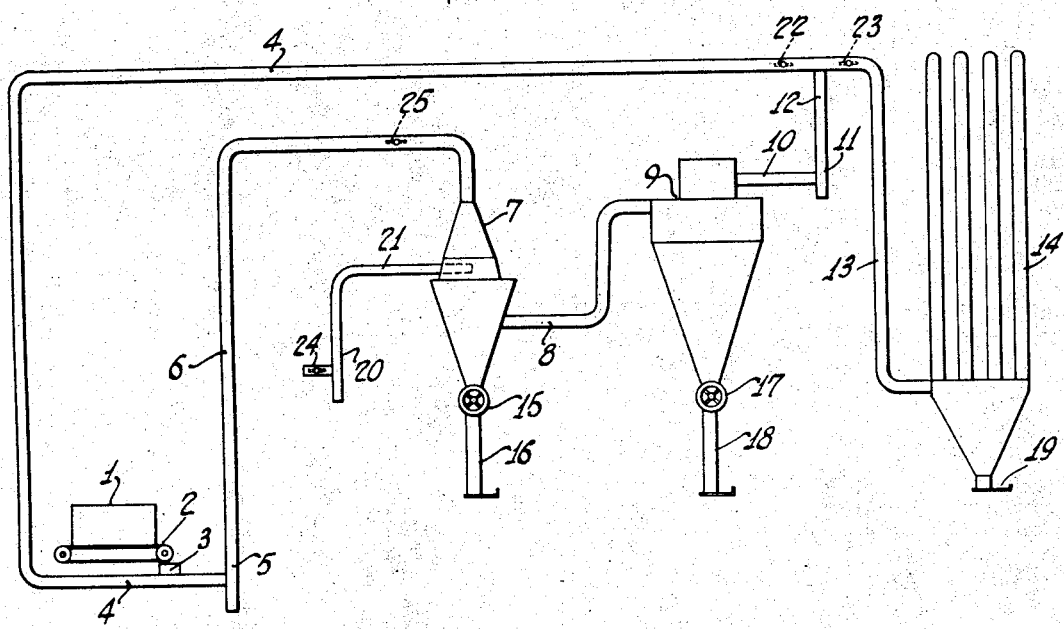

Referring to Fig. 1, suitably comminuted, disintegrated and pulverulent materials are introduced into the system through the medium of a suitable feeding device 1 and conveyor 2. The conveyor deposits the materials through the opening 3 into pipe 4 of the pneumatic system, wherein separation and classification of the materials will take place.

A blower 5 tends to suspend the comminuted materials in air and conveys the materials through pipe 6 to the classifier 7, wherein separation of the coarse and fine materials will occur. After the materials have been separated into the coarse and fine fractions, the fine fraction is conveyed through a conduit 8 to the cyclone 9, wherein further separation of the fine materials is made. After the air carrying a considerable portion of fines leaves the cyclone, it passes through pipe 10 and a blower 11 tends to force the air through pipe 12 back into pipe 4, where a portion of the air is diverted into pipe 13, which leads to the bag house 14.

In the separating apparatus the coarse fractions are withdrawn through rotary valve 15 and spout 16. Similarly, in the cyclone 9 the coarser fractions are separated from the system through a rotary valve 17 and dropped into spout 18. Also, in the bag house the very fine components of the fraction are removed through sliding valve 19.

Additional air is introduced into the classifier through the medium of the blower 20 and conduit 21 which will tend to impart, as will be discussed below, a more thorough washing action to the materials as the materials pass through the classifier 7. Suitable dampers 22, 23, 24 and 25 are advantageously distributed throughout the system for proper control of the volume of air. These dampers may be opened and closed at will, depending upon the quantity of air which may be considered desirable to pass through the separator, cyclone and bag house of the system.

Figure 2:
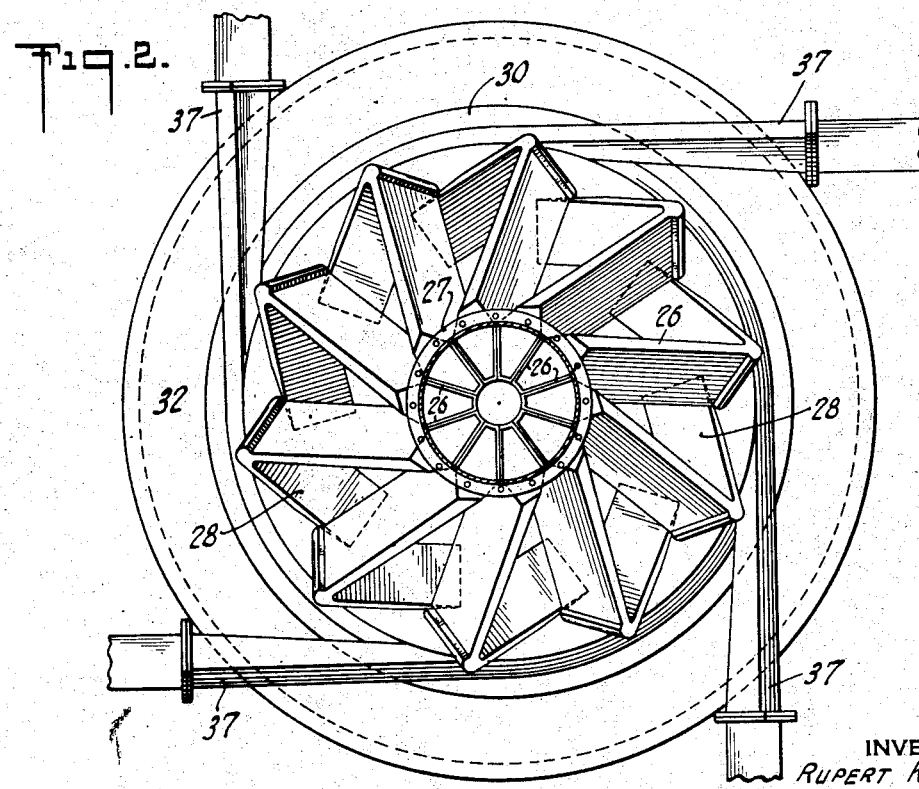
Fig. 2 is a plan view of the improved classifier.

The details of the novel classifier are more specifically illustrated in Figs. 2 and 3 and include a classifying section 30 which is substantially cylindrical in shape. The walls of the classifier 30 may be substantially vertical, to form a cylinder, or sloping, as illustrated in the drawing, to form a cylindrical portion substantially in the form of a truncated cone. A top closure plate 29 covers the upper portion of the classifier 30. The plate 29 as shown in the drawing is in the form of an inverted cone, but it is to be understood that the closure may be a flat plate. Conduits 26, joined together by a common header plate 27, are connected with the closure plate 29 and the upper portion of the classifier 30.

At the lower portion of the conduit 26, the conduit is angularly bent so that the connection with the plate 29 will be at a substantial angle. Thus any fluid passing through conduit 26 will be injected into the classifier 30 at an angle, but it is preferable that the angle formed between the conduit 26 and the plate 29 be less than a right angle, so that the fluid entering the classifier 30 will tend to form a downwardly moving vortex. A convenient modification may be to have a swivel joint, a universal joint, or other adjusting means at point 28 at the lower portion of conduits 26. Such a modification is more fully illustrated in Figs. 4, 5, and 6 described below. Through the medium of such a modification the direction of the entering air streams with respect to the classifier wall 30 may be varied.

A hopper 31 in the form of a housing is fastened to the lower portion of the classifier 30 through the medium of a head plate 32. The upper end of the housing should have a diameter greater than the diameter of the bottom portion of the classifier 30. The larger area of the housing is essential at this point to accommodate the equipment for separating the coarse and fine components of the downwardly moving vortex. Mounted within the hopper 31 is a funnel member 33 which is located in such a position that the opening will communicate with the lower and substantially central portion of the classifier 30. Pipe 34 is connected with the funnel member 33 in order to convey the fluid and suspended particles, not thrown out into hopper 31, away from the classifier. The upper edge of the funnel member 33 is provided with an outwardly and downwardly extending apron in the form of a truncated cone, the outer edge of the apron 35 being directed toward the side walls of the hopper 31. It is essential that the surfaces of the apron 35 be spaced from the lower edges of the walls of the classifier in order that an open passage 36 exist at this particular point.

Additional conduits 37 having entry ports 38 are spaced around the outer walls of classifier 30. The conduits 37 are supplied with air through pipe 21, illustrated in the diagrammatic Fig. 1.

The entire classifier and hopper structure is suitably supported on any convenient base 39 and stabilized by means of reinforcement or bracing elements 40 and 41.

In Figs. 4, 5 and 6, a modified form of pneumatic classifier is illustrated showing a convenient adjusting means to vary the position of the elbow section attached to conduit 26'.

Referring to Figs. 4, 5 and 6, a conduit elbow section 42 is fastened to a suitable flange 43. A cylindrical spacer section 44 is fastened to plate 29 at its lower portion and its upper portion is fastened to flange 45. An additional flange 46 is fastened to the lower portion of conduit 26. Arcuate slots 48 are properly spaced in flange 43 and form the limits to which elbow section 42 may be moved during the adjusting operation. Securing means, preferably bolts 47, fasten flanges 45, 43 and 46 together. The angle at which elbow 42 extends into the upper portion of classifier 30 may be changed by loosening bolts 47 and moving flange 43 by means of handle 49 secured to flange 43.

In the sectional view of the classifier illustrated in Fig. 4, elbows 42 extend through and slightly below closure plate 29 but above the plane of conduits 37 which are spaced around the outer walls of classifier 30. In Fig. 3, conduits 26 are illustrated as entering the classifier at approximately the intersection point of closure plate 29 and conduits 26.

An upwardly extending housing 50 preferably in the form of a truncated cone, Fig. 4, may be placed at the upper portion of conduits 26 and connected with pipe 6. Cone 51 is placed inside the truncated cone section 50 and serves as a medium to uniformly distribute the fluid and suspended particles to conduits 26.

In operation, fluid bearing disintegrated, pulverulent or comminuted materials is fed through pipe 6 to conduits 26, which convey the materials into the classifier 30 through the top closure plate 29. Inasmuch as the conduits are placed so as to discharge the fluid at a substantial angle, a rotating motion in the form of a downwardly moving vortex will be created within the classifier. In this operation the coarse particles will be thrown toward the outer edges of the vortex, owing to the greater centrifugal force of the heavier components. In the drawing ten conduits are shown as entering the classifier, but this number may conveniently be changed, depending upon the nature of the material being treated and the separation desired.

Secondary fluid, which is substantially free from any suspended materials, is introduced at spaced points into the lower portion of the classifier. Generally, the secondary conduits are directed into the classifier substantially tangentially to the walls of the classifier, although it is understood that the angle of entry of the conduits 37 may be varied so that they are tangent to a circle of smaller diameter than the diameter of classifier chamber 30.

The secondary fluid will tend to have a washing effect on the downwardly moving vortex and move the coarser and heavier particles toward the walls of the classifier 30, and the finer particles will remain toward the interior portion of the vortex. When the fluid stream reaches the lower portion of the classifier, the coarser and heavier particles will be diverted into hopper 31 through the medium of the downwardly sloping apron 35. Inasmuch as the finer particles are toward the interior of the downwardly moving vortex, these particles will pass into the funnel member 33.

In the above, a description of the apparatus and the movement of various currents has been given which accomplish an improved separating action. A consideration of the following data will demonstrate the improved performance of the novel separator as compared to the separating action in the separator claimed and described in my previous patent.

The following performance tests were made on diatomaceous earth of substantially the same particle size in each operation. The diatomaceous earth materials used in the tests for classification are a flux calcined diatomaceous earth material of substantially coarser particle size than commercial filter powders or fillers. This type of material has been difficult to separate with previously known separators.

|  | Separator 1 | | Separator 2 | |
| --- | --- | --- | --- | --- |
|  | Separator (coarse fraction) | Cyclone (fine fraction) | Separator (coarse fraction) | Cyclone (fine fraction) |
| Pounds | 1,850 | 2,121 | 1,114 | 1,941 |
| Percentage | 46.6 | 53.4 | 36.5 | 63.5 |
| Flow rate vs. standard (100%) | 160 | 107 | 227 | 102 |
| Wet density, lbs./cu. ft. | 17.9 | 14.4 | 17.6 | 14.9 |

Separator 1 was designed in accordance with the disclosure of my previous patent, while, on the other hand, separator 2 was designed in accordance with the disclosure of the present application.

It will be noted that a significantly higher percentage of the fine materials (cyclone product) was removed from the mixture in the separator 2 as compared to the separation in separator 1. Attention is directed to the fact that with separator 1 the ratio of the coarse to fine fraction is 1:1.146, whereas, with the improved separator described and claimed herein, the corresponding ratio of coarse to fine fraction is 1:1.743. This definitely demonstrates a cleaner and sharper classification of the various particles.

Attention is also directed to the increased flow rate of the separator products, which is one of the important features of the products separated in the novel apparatus. The improved flow rate of the separator products is of great importance in faster filtration operations, particularly in industries where speed-up of filtrations is desired. It will be noted that the flow rate of the coarse fraction from separator 2 is significantly higher than the flow rate of the coarse fraction from separator 1. This demonstrates that a cleaner and sharper separation of coarse from fine particles was made by separator 2.

The present apparatus has distinct advantages over the apparatus described and claimed in my previous patent. Through the use of the present apparatus, the separation of the materials into various fractions can be effected with greater efficiency. The line of division between the fractions will be relatively sharp.

The details of the apparatus that have been given are for the purpose of illustration, not restriction. It is intended that variations within the spirit of the invention are included within the scope of the claims.

What I claim is:

1. In solid particle classifying and separating apparatus, an upright substantially cylindrical classifying chamber, concentrically arranged outlets in the bottom of said chamber for the separate removal of coarse and fine particles, a plurality of spaced fluid inlet ports disposed in at least two vertically and horizontally spaced circular rows within the chamber, means including certain of said ports for introducing at high velocity into the upper portion of said classifier at spaced points on a circle of smaller diameter than the classifier a plurality of downwardly inclined streams of fluid bearing disintegrated material in suspension, in a direction substantially parallel circumferentially to the chamber walls, whereby a downwardly moving vortex is developed, and means for introducing through other ports a plurality of horizontally directed streams of a secondary fluid at high velocity tangentially into the lower portion of the chamber.

2. In solid particle classifying and separating apparatus, an upright substantially cylindrical classifier, concentrically arranged outlets in the bottom of the classifier for the separate removal of coarse and fine particles, a plurality of spaced fluid inlet ports disposed in at least two vertically and horizontally spaced circular rows within the chamber, means for introducing at high velocity into the upper portion of said classifier at certain ports spaced from the classifier walls a plurality of downwardly inclined streams of fluid bearing disintegrated material in suspension, in a direction substantially parallel circumferentially to the classifier walls, whereby to develop a downwardly moving vortex, means for adjusting the angle formed by each of said entering streams with respect to the adjacent classifier wall, and means including ports in the circumferential wall of said classifier for tangentially introducing high velocity streams of secondary fluid substantially horizontally into the lower portion of the classifier.

RUPERT K. ROURKE.